(12) United States Patent
Suzuki

(10) Patent No.: US 7,102,322 B2
(45) Date of Patent: Sep. 5, 2006

(54) MOTOR CONTROLLER

(75) Inventor: Hiroshi Suzuki, Okazaki (JP)

(73) Assignees: Favess Co., Ltd., Okazaki (JP); Toyoda Koki Kabushiki Kaisha, Kariya (JP); Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 11/171,197

(22) Filed: Jul. 1, 2005

(65) Prior Publication Data

US 2006/0006834 A1    Jan. 12, 2006

(30) Foreign Application Priority Data

Jul. 6, 2004    (JP)    ............... 2004-199837

(51) Int. Cl.
*H02P 27/04*    (2006.01)

(52) U.S. Cl. ............. 318/801; 318/599; 318/811; 318/727

(58) Field of Classification Search ............ 378/801, 378/599, 811, 727, 434, 433, 432
See application file for complete search history.

(56) References Cited

U.S. PATENT DOCUMENTS

| | | | |
|---|---|---|---|
| 5,404,862 A * | 4/1995 | Ohta et al. | ............. 123/698 |
| 5,544,039 A | 8/1996 | Hiroi | |
| 6,535,402 B1 | 3/2003 | Ying et al. | |
| 2003/0048086 A1* | 3/2003 | Takahashi et al. | ............. 318/430 |
| 2005/0047175 A1* | 3/2005 | Kawasaki et al. | ............. 363/16 |

FOREIGN PATENT DOCUMENTS

| | | |
|---|---|---|
| JP | 9-121558 | 5/1997 |
| JP | 2004-80954 | 3/2004 |

OTHER PUBLICATIONS

Hidehiko Sugimoto, et al. "Facts of Theory and Design of AC Servo Motor Systems", pp. 56-59.

* cited by examiner

*Primary Examiner*—Karen Masih
(74) *Attorney, Agent, or Firm*—Oblon, Spivak, McClelland, Maier & Neustadt, P.C.

(57) ABSTRACT

A microcomputer includes an actual DUTY value detection section that detects an actual DUTY value $\gamma x$ by measuring the ratio of time in which an output voltage of each phase becomes a power supply voltage in a cycle of a triangular wave. A dead time compensation computation section subtracts the actual DUTY value $\gamma x$ from a DUTY instruction value $\alpha x$ before correction, thereby computing a difference value $\Delta x$. Subsequently, the dead time compensation computation section adds the difference value $\Delta x$ to dead time compensation amounts $\beta xp$, $\beta xm$, which have been used for correcting the DUTY instruction value $\alpha x$, thereby determining new dead time compensation amounts $\beta xp'$ and $\beta xm'$. The dead time compensation amounts $\beta xp$, $\beta xm$ stored in a memory are renewed with the new dead time compensation amounts $\beta xp'$, $\beta xm'$.

8 Claims, 4 Drawing Sheets

$\alpha = (t1+t2)/T = (t3+t4)/T = (t5+t6)/T$ ously turns on and off the high voltage side switching element 51A and the low voltage side switching element 51B of each arm 52 at a predetermined timing, thereby supplying three-phase drive power to a brushless motor 53.

MOTOR CONTROLLER

BACKGROUND OF THE INVENTION

The present invention relates to a motor controller.

Conventionally, a type of a motor controller has been used which converts direct-current voltage supplied from a direct-current power supply to three-phase (U, V, W) drive power using a PWM (pulse-width modulation) inverter, and supplies the three-phase drive power to a brushless motor.

As shown in FIG. 3, a PWM inverter is configured of three arms 52 in parallel as basic units. Each arm 52 corresponds to one of the phases and includes a pair of switching elements (for, example, power MOSFETs) 51A, 51B in series. The motor controller alternately turns on and off the high voltage side switching element 51A and the low voltage side switching element 51B of each arm 52 at a predetermined timing, thereby supplying three-phase drive power to a brushless motor 53.

In such a motor controller, to prevent a short circuit (arm short circuit) between each high voltage side switching element 51A and the corresponding low voltage side switching element 51B, "dead time" is set when the switching elements 51A, 51B are turned on and off, in which both switching elements 51A, 51B are off. However, the dead time causes errors to occur between a voltage command value and an output voltage of the PWM inverter. This in turn creates torque ripples, vibrations, and current distortion, which can cause noise. Therefore, a number of types of motor controllers executes "compensation" for reducing errors between a voltage command value and an output voltage due to dead time, thereby preventing current distortion. See Hidehiko Sugimoto et al. *Facts of Theory and Design of AC Servo Motor Systems*, 6th edition, Denshi Shuppansha, August 2002, pp. 56–58.

For example, as shown in FIG. 4, a method has been proposed in which a dead time compensation amount β is added to or subtracted from a DUTY instruction value αx. The DUTY instruction value αx is compared with a triangular wave δ, which is a carrier wave, for determining the timing of turning on and off the switching elements 51A, 51B. The dead time compensation amount β is set in advance according to the direction of current of the DUTY instruction value αx.

More specifically, when the direction of current of X-phase (X=U, V, W, the same applies hereinafter) that corresponds to one of the arms 52 is toward the brushless motor 53 from the arm 52, that is, when the direction of current is "positive" (see FIG. 3), the dead time compensation amount β is added to the DUTY instruction value αx. When the direction of current is toward the arm 52 from the brushless motor 53, that is, when the direction of current is "negative" (see FIG. 3), the dead time compensation amount β is subtracted from the DUTY instruction value αx. This equalizes a time in which the X-phase output voltage Vx becomes the power supply voltage Vb (t3+t4 or t5+t6) in a cycle T of the triangular wave 5 with the corresponding time (t1+t2) in a case where no dead time is set (ideal voltage waveform). Thus, the voltage command value is caused to match the output voltage of the PWM inverter, so that current distortion due to dead time is prevented.

Other than the method described above, a method has been proposed in which the output voltage of PWM inverters are detected, and feedback control is executed so that the values of the output voltage match a voltage command value. This method also prevents current distortion due to dead time.

However, the switching elements forming a PWM inverter vary in response speed. Further, the switching elements vary in temperature characteristics and aging characteristics, which depend on the usage environment. Therefore, the above introduced method in which the DUTY instruction value αx is corrected using the dead time compensation amount β, compensation amounts of the phases and directions of current can be insufficient or excessive depending on the usage environment. This may lead to a situation where current distortion due to dead time is not prevented with accuracy. On the other hand, the method using feedback control, a delay is inevitable in providing compensation.

SUMMARY OF THE INVENTION

Accordingly, it is an objective of the present invention to provide a motor controller that performs highly accurate compensation without delay.

To achieve the foregoing objective, the present invention provides a motor controller having a PWM output section and a PWM inverter. The PWM output section outputs a gate ON/OFF signal by comparing a DUTY instruction value and a carrier wave. The PWM inverter is formed of a plurality of switching element circuits in parallel, each switching element circuit being formed of a pair of switching elements in series. The PWM inverter converts direct-current power supply into three-phase driving power by turning on and off each switching element based on the gate ON/OFF signal, and supplies the three-phase driving power to a motor such as a brushless motor. Dead time is set in the gate ON/OFF signal for preventing arm short circuits in each switching element.

The motor controller includes: a current direction detection section for detecting a direction of current of each phase; a memory section storing, for each phase, a first compensation amount that corresponds to a case where the direction of current is a positive direction, and a second compensation amount that corresponds to a case where the direction of current is a negative direction; a dead time compensation section for correcting the DUTY instruction value for each phase and the direction of current of the phase by adding the first compensation amount or the second compensation amount to the DUTY instruction value according to the detected direction of current; and an actual DUTY value detection section that measures time in which the output voltage of each phase of the PWM inverter becomes the power supply voltage in one cycle of the carrier wave, thereby detecting an actual DUTY value that corresponds to the DUTY instruction value. The dead time compensation section adds a difference value between the DUTY instruction value before the correction and the actual DUTY value to the compensation amount used in the correction, thereby determining a new compensation amount, and the dead time compensation section renews the compensation amount used in the correction with the new compensation amount and stores the new compensation amount in the memory section.

According to the above configuration, since DUTY instruction values are corrected independently for each phase and its direction of current, current distortion due to dead time is accurately compensated for even if the response speeds of the switching elements forming the PWM inverter vary among the individuals.

Further, an actual DUTY value that corresponds to the DUTY instruction value is detected, and a difference value between the DUTY instruction value before correction and the actual DUTY value is computed, so that insufficiency or excess of the compensation amount used for correcting the DUTY instruction value is obtained. Then, the difference value is added to the compensation amount that has been used for correction to determine a new compensation amount. The compensation amount that has been used for correction is renewed with the new compensation amount. Thus, the subsequent dead time compensation will be executed with higher accuracy.

Also, since the determination of the new compensation amount and the storing of the new compensation amount in the memory section are performed at any time, variations in temperature characteristics and aging characteristics, which depend on the use environment, are compensated for in addition to the individual differences of the response speeds of the switching elements. As a result, irrespective of the usage environment, current distortion due to dead time is prevented with high accuracy, so that torque ripple and noise due to vibration that accompany current distortion are suppressed. In addition, since the DUTY instruction value is corrected by adding the compensation amount stored in the memory section to the DUTY instruction value, a delay due to compensation does not occur as in a case where feedback control such as PID control is executed.

Further, since the compensation amount stored in the memory section is successively renewed with a newly determined compensation amount, the compensation amount does not need to be determined at initialization (when determining factory default settings). For example, all the compensation amounts for all the phases and the all the directions of current may be set to zero. This eliminates the setting process and thus reduces the manufacturing costs.

Other aspects and advantages of the invention will become apparent from the following description, taken in conjunction with the accompanying drawings, illustrating by way of example the principles of the invention.

BRIEF DESCRIPTION OF THE SEVERAL VIEWS OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Hereinafter, a preferred embodiment according to the present invention will be described.

Figure 1:
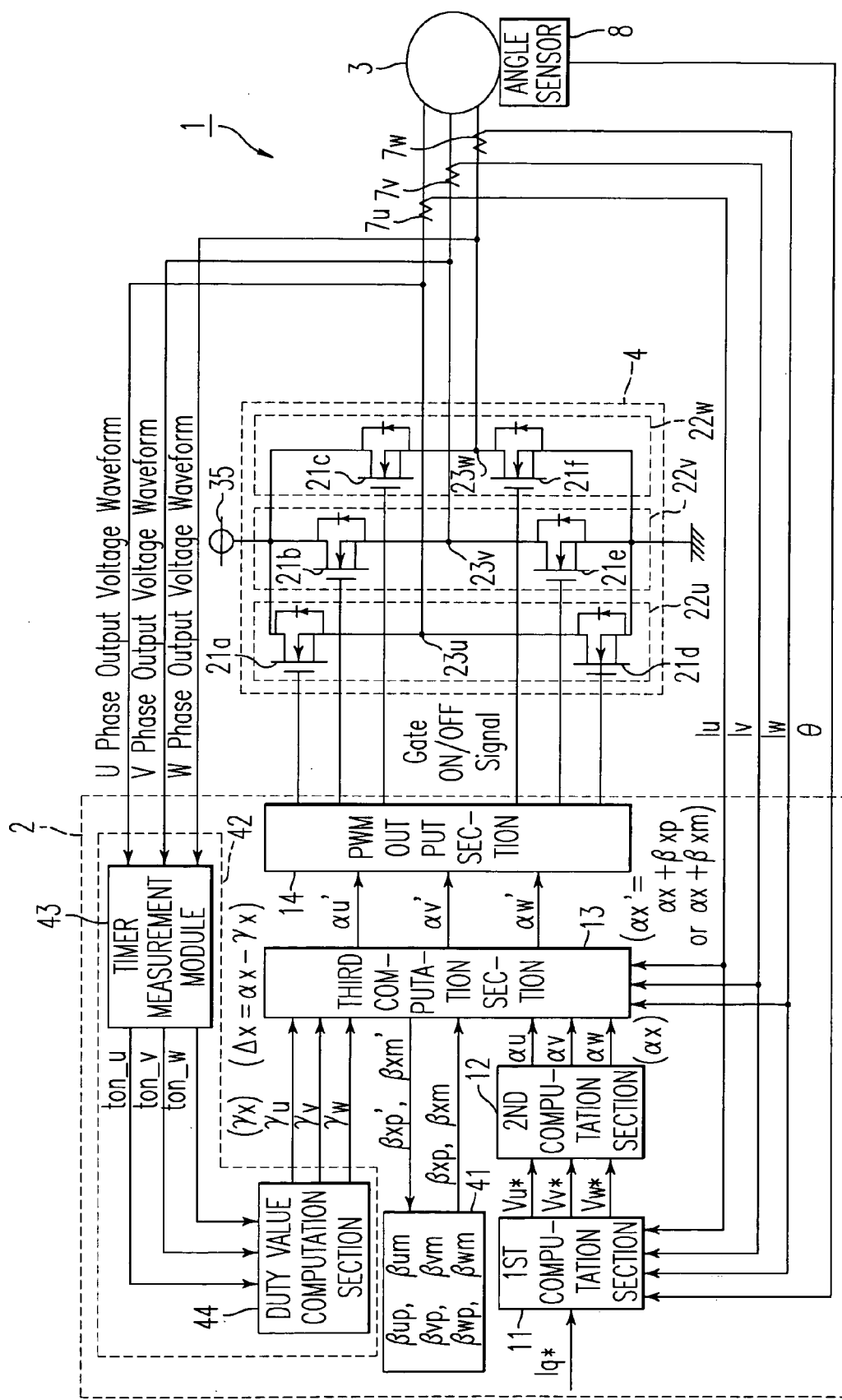
FIG. 1 is a diagram illustrating a motor controller according to one embodiment.

As shown in FIG. 1, a motor controller 1 includes a microcomputer 2 that outputs gate ON/OFF signals and a PWM (pulse-width modulation) inverter 4 that supplies three-phase driving power to a brushless motor 3 based on the gate ON/OFF signals.

The microcomputer 2 is connected to current sensors 7u, 7v, 7w for detecting phase current values Iu, Iv, Iw supplied to the brushless motor 3, and a rotation angle sensor 8 for detecting the rotation angle (electrical angle) θ of the brushless motor 3. Based on output signals from the sensors, the microcomputer 2 detects the phase current values Iu, Iv, Iw of the brushless motor 3 and the rotation angle θ. Then, based on the phase current values Iu, Iv, Iw and the rotation angle θ, the microcomputer 2 outputs the gate ON/OFF signals.

Specifically, the phase current values Iu, Iv, Iw detected by the current sensors 7u, 7v, 7w and the rotation angle θ detected by the rotation angle sensor 8 are sent to a computation section 11 for a phase voltage command value, or, a first computation section 11, together with a current command value Iq*. Based on the phase current values Iu, Iv, Iw, the rotation angle θ, and the current command value Iq*, the first computation section 11 computes command values for voltage applied to each phase of the brushless motor 3, that is, phase voltage command values Vu*, Vv*, Vw*.

In the present embodiment, the first computation section 11 executes current control in a d–q coordinate system for computing the phase voltage command values Vu*, Vv*, Vw*. That is, the current command value Iq* is inputted to the first computation section 11 as a q axis current command value, and the phase current values Iu, Iv, Iw are subjected to d/q conversion based on the rotation angle θ. Based on the q axis current command value and d, q axes current values computed through d/q conversion, the first computation section 11 computes d, q axes voltage command values, and subjects the d, q axes voltage command values to d/q inversion, thereby computing the phase voltage command values Vu*, Vv*, Vw*.

The first computation section 11 sends the phase voltage command values Vu*, Vv*, Vw* thus computed to a computation section 12 for a DUTY instruction value, or a second computation section 12. Based on the phase voltage command values Vu*, Vv*, Vw*, the second computation section 12 computes DUTY instruction values αu, αv, αw of the phases.

In the present embodiment, the DUTY instruction values αu, αv, αw computed by the second computation section 12 are sent to a compensation computation section 13, or a third computation section 13. The third computation section 13 executes correction for compensating for current distortion due to dead time set for the gate ON/OFF signals, that is, executes dead time compensation computation. The third computation section 13 sends corrected DUTY instruction values αu', αv', αw' to a PWM output section 14.

Then, based on the comparison between the inputted DUTY instruction values αu', αv', αw' and the triangular wave δ, which is a carrier wave, the PWM output section 14 generates the gate ON/OFF signal (see FIG. 4), and sends the gate ON/OFF signal to the PWM inverter 4.

On the other hand, the PWM inverter 4 is formed of a plurality (2×3) of power. MOSFETs (hereinafter, simply referred to as FETs), each of which corresponds to one of the phases of the brushless motor 3. More specifically, the PWM inverter 4 is formed by connecting three arms 22u, 22v, 22w in parallel, which arms 22u, 22v, 22w are a series circuit of FETs 21a, 21d, a series circuit of FETs 21b, 21e, and a series circuit of FETs 21c, 21f. A node 23u of the FETs 21a, 21d is connected to a U phase coil of the brushless motor 3, a node 23v of the FETs 21b, 21e is connected to a V phase coil of the brushless motor 3, and a node 23w of the FETs 21c, 21f is connected to a W phase coil of the brushless motor 3.

The gate ON/OFF signals outputted by the PWM output section 14 of the microcomputer 2 are applied to the gate terminals of the FETs 21A to 21f. In response to the gate ON/OFF signals, the FETs 21a to 21f are turned on and off.

This converts direct current voltage from the direct-current power supply 35 into driving power of each phase, which is in turn supplied to the brushless motor 3.

Operation of the compensation executed by the motor controller of the present embodiment will now be described.

In the present embodiment, the compensation computation section 13, that is, the third computation section 13 receives the phase current values Iu, Iv, Iw detected by the current sensors 7u, 7v, 7w. Based on the received phase current values Iu, Iv, Iw, the third computation section 13 detects the direction of current of each phase. The third computation section 13 then adds a dead time compensation amount to each of the DUTY instruction values αu, αv, αw of the phases from the second computation section 12. Each dead time compensation amount corresponds to the direction of current of one of the DUTY instruction values αu, αv, αw. The third computation section 13 thus corrects, or compensates for, the direction of current of each phase.

Figure 3:
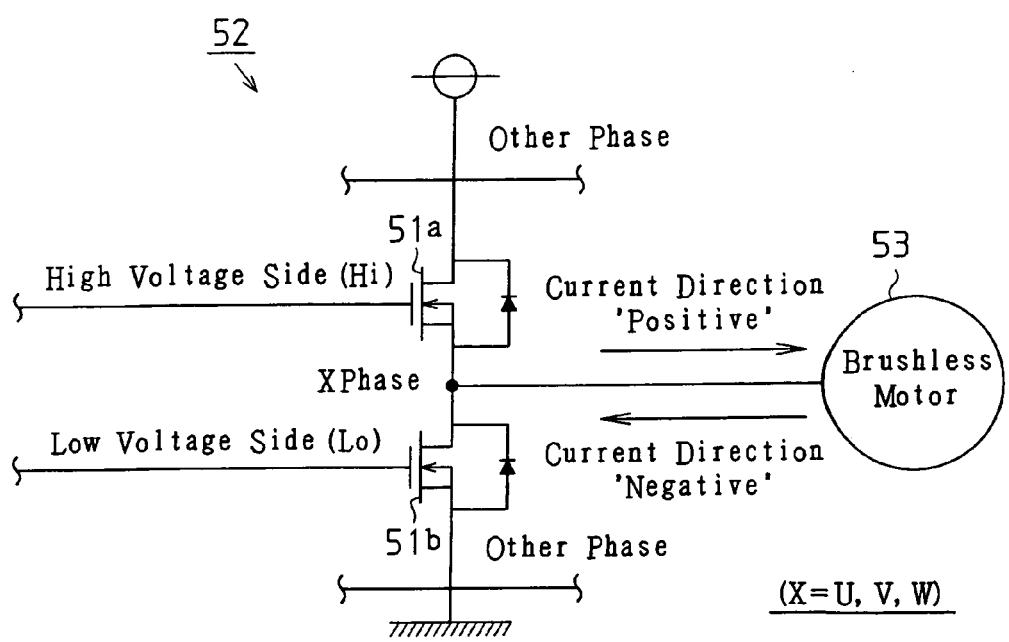
FIG. 3 is a diagram showing an arm of a prior art PWM inverter.

Specifically, when the direction of current of X phase (X=U, V, W) is positive (rightward direction as viewed in FIG. 3), the third computation section 13 adds a dead time compensation amount βxp, which corresponds to the positive direction, to the DUTY instruction value αx, so that the corrected DUTY instruction value αx' is greater than the DUTY instruction value αx before correction. When the direction of current is negative (leftward direction), the third computation section 13 adds a dead time compensation amount βxm, which corresponds to the negative direction, so that the corrected DUTY instruction value αx' is less than the DUTY instruction value αx before correction.

More specifically, the microcomputer 2 has a memory 41 that stores the dead time compensation amounts βxp (βup, βvp, βwp) and βxm (βum, βvm, βwm) for each phase. The third computation section 13 reads out the dead time compensation amount βxp or βxm from the memory 41 that corresponds to the direction of current. The third computation section 13 adds the dead time compensation amount βxp or βxm to the DUTY instruction value αx sent from the second computation section 12, to correct the DUTY instruction value αx. The third computation section 13 then outputs corrected DUTY instruction value αx' to the PWM output section 14.

For example, when the direction of current of the U phase is positive, and the directions of current of the V phase and the W phase are negative, the third computation section 13 reads out from memory 41 a dead time compensation amount βup that corresponds to the positive direction of the U phase, and dead time compensation amounts βvm, βwm that correspond to the negative direction of the V phase and W phase. Then, the third computation section 13 adds the dead time compensation amount βup to the DUTY instruction value αu of the U phase, and adds the dead time compensation amounts βvm, βwm to the DUTY instruction values αv, αw of the V phase and the W phase, respectively, thereby correcting the DUTY instruction values αu, αv, αw. Subsequently, the third computation section 13 sends the corrected DUTY instruction values αu', αv', αw' to the PWM output section 14.

Further, the microcomputer 2 of the present embodiment includes an actual DUTY value detection section 42. The actual DUTY value detection section 42 measures the ratio of time during which (FIG. 4) the output voltage of each phase becomes the power supply voltage Vb in the cycle T of the triangular wave δ, which is a carrier wave in the PWM control, thereby detecting an actual DUTY value γx that corresponds to the DUTY instruction value αx. The actual DUTY value γx detected by the actual DUTY value detection section 42 is sent to the third computation section 13, and the third computation section 13 computes a difference value Δx between the DUTY instruction value αx before correction and the actual DUTY value γx. Then, based on the difference value Δx, the third computation section 13 determines a new dead time compensation amount.

Specifically, the actual DUTY value detection section 42 is formed of a timer measurement module 43 and an actual DUTY value computation section 44. The timer measurement module 43 receives output voltage waveforms of the U, V, and W phases, which are formed to be measurable. The timer measurement module 43 measures time from rising to falling of the output waveforms, thereby measuring ON times ton_u, ton_v, ton_w, during each of which the output voltage of one of the phases of the PWM inverter 4 becomes the power supply voltage Vb. The actual DUTY value computation section 44 divides the ON times ton_u, ton_v, ton_w sent from the timer measurement module 43 by the cycle T of the triangular wave δ, thereby computing the actual DUTY value γx (γu, γv, γw) of the output voltage of the phases.

The third computation section 13 subtracts the actual DUTY value γx sent from the actual DUTY value computation section 44 from the DUTY instruction value αx before correction, thereby computing the difference value Δx. Subsequently, the third computation section 13 adds the difference value Δx to the dead time compensation amounts βxp, βxm, which have been used for correcting the DUTY instruction value αx, thereby determining new dead time compensation amounts βxp' and βxm'. The third computation section 13 then writes the new dead time compensation amounts βxp', βxm' in the memory 41, thereby renewing the dead time compensation amounts βxp, βxm stored in the memory 41.

For example, suppose that the dead time compensation amounts βup, βvm, βwm read out from the memory 41 are used for correcting the DUTY instruction values αu, αv, αw, and that the corrected DUTY instruction values αu'=(αu+βup), αv'=(αv+βvm), and αw'=(αw+βwm) are sent to the PWM output section 14.

The third computation section 13 subtracts the actual DUTY values γu, γv, γw corresponding to the DUTY instruction values αu', γv', and αw' from the DUTY instruction values αu, αv, αw, respectively, thereby computing difference values Δu=(αu−γu), Δv=(αv−γv), and Δw=(αw−γw).

Subsequently, the third computation section 13 adds the difference values Δu, Δv, Δw to the dead time compensation amounts βup, βvm, βwm, respectively, thereby determining new dead time compensation amounts βup'=(βup+Δu), βvm'=(βvm+Δv), and βwm'=(αwm+Δw). Then, the third computation section 13 writes the new dead time compensation amounts βup', βvm', βwm' in the memory 41, thereby renewing the dead time compensation amount βup, βvm, βwm stored in the memory 41 with the new dead time compensation amounts βup', βvm', and βwm'.

In this manner, the third computation section 13 determines the dead time compensation amounts βxp' and βxm' for each phase and its direction of current, and renews the dead time compensation amounts βxp, βxm stored in the memory 41.

In the present embodiment, the compensation computation section 13 forms a current direction detection section and compensation section. The memory 41 forms a memory section.

Next, a procedure for compensation according to the present embodiment will be described.

As described above, X phase represents each of the U, V, and W phases, and the third computation section 13 executes the following compensation procedure independently for each of the phases.

Figure 2:
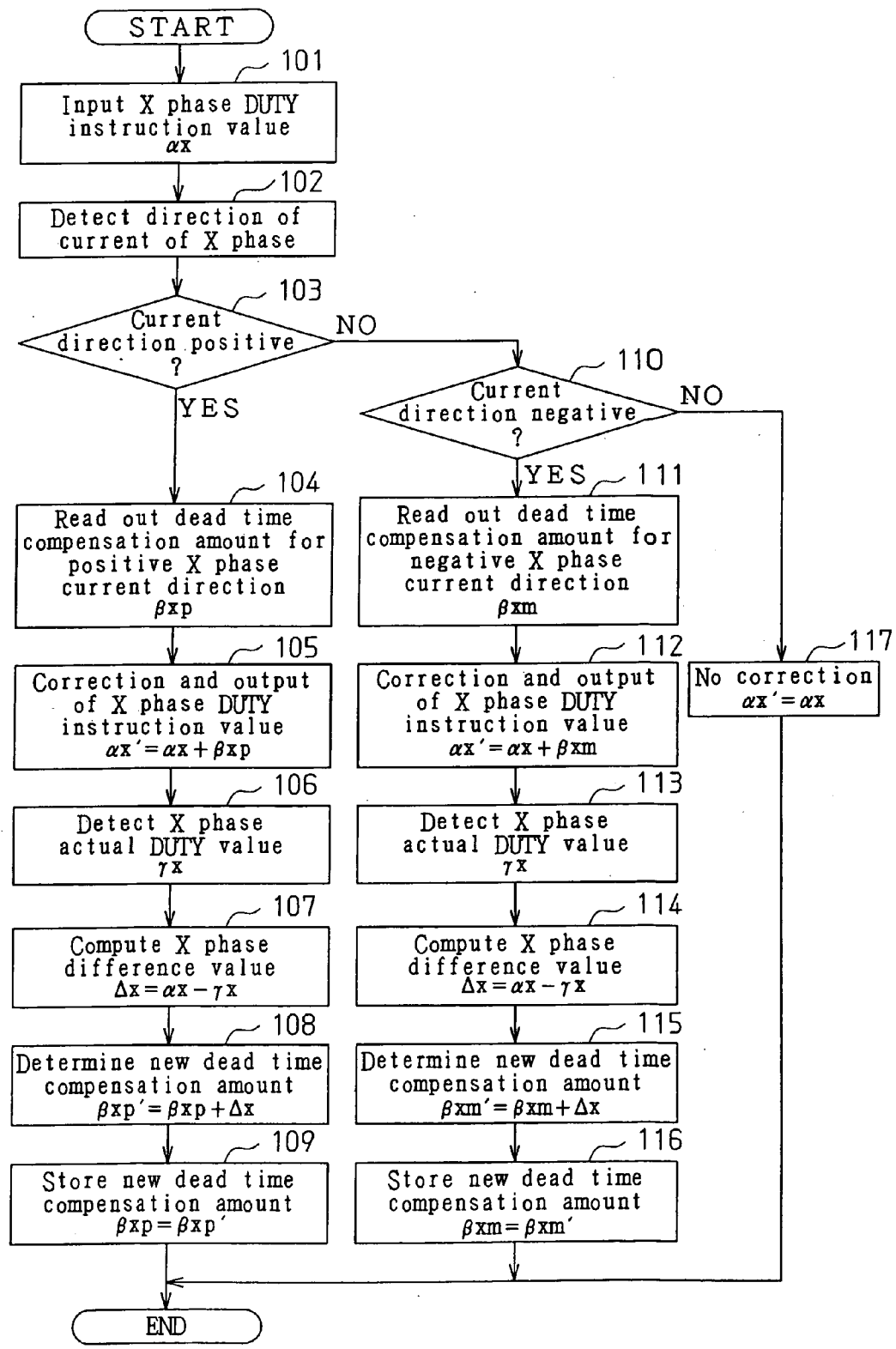
FIG. 2 is a flowchart showing a compensation procedure for a preferred embodiment.

As shown in the flowchart of FIG. 2, when receiving the DUTY instruction value αx of the X phase from the second computation section 12 (step 101), the third computation section 13 detects the direction of current of the X phase (step 102). Then, in accordance with the detected direction of current, the third computation section 13 executes the following steps 103 to 117. That is, the third computation section 13 corrects the DUTY instruction value αx, outputs the corrected DUTY instruction value αx', determines new dead time compensation amounts βxp', βxm', and renews dead time compensation amounts βxp, βxm stored in the memory 41.

More specifically, the third computation section 13 first determines whether the direction of current of the X phase, which has been detected at step 102, is "positive" (step 103). When determining that the direction of current is "positive" (step 103: YES), the third computation section 13 reads out the dead time compensation amount βxp that corresponds to the positive direction from the memory 41 (step 104). Then, the third computation section 13 adds the dead time compensation amount βxp to the DUTY instruction value αx, which has been received at step 101, thereby correcting the DUTY instruction value αx. The third computation section 13 outputs the corrected DUTY instruction value αx' to the PWM output section 14 (αx'=αx+βxp, step 105).

Subsequently, when the actual DUTY value γx, which corresponds to the DUTY instruction value αx', is detected in the actual DUTY value detection section 42 (step 106), the third computation section 13 subtracts the actual DUTY value γx from the DUTY instruction value αx before correction, thereby computing the difference value Δx (Δx=αx−γx, step 107).

Then, the third computation section 13 adds the difference value Δx computed at step 107 to the dead time compensation amount βxp, which has been used in the correction process at step 105, thereby determining a new dead time compensation amount βxp' (βxp'=βxp+Δx, step 108).

The third computation section 13 writes the new dead time compensation amount βxp' in the memory 41, thereby renewing the dead time compensation amount βxp stored in the memory 41 with the new dead time compensation amount βxp'. That is, the third computation section 13 renews the dead time compensation amount βxp used for the correction process at step 105 with the new dead time compensation amount βxp', and stores the new dead time compensation amount βxp' in the memory 41 (βxp=βxp', step 109).

On the other hand, when determining that the direction of current of the X phase detected at step 102 is not "positive" at step 103, (step 103: NO), the third computation section 13 determines whether the direction of current is "negative" (step 110). When determining that the direction of current is "negative" (step 110: YES), the third computation section 13 reads out the dead time compensation amount βxm the memory 41, which corresponds to the negative direction (step 111).

Next, the third computation section 13 adds the dead time compensation amount βxm to the DUTY instruction value αx received at step 101, thereby correcting the DUTY instruction value αx. The third computation section 13 outputs the corrected DUTY instruction value αx' to the PWM output section 14 (αx'=αx+βxm, step 112).

When the actual DUTY value detection section 42 detects the actual DUTY value γx, which corresponds to the outputted DUTY instruction value αx' (step 113), the third computation section 13 subtracts the actual DUTY value γx from the DUTY instruction value αx, thereby computing the difference value Δx (Δx=αx−γx, step 114).

Subsequently, the third computation section 13 adds the difference value Δx to the dead time compensation amount βxm, which has been used in the correction process at step 112, thereby determining a new dead time compensation amount βxm' (βxm'=βxm+Δx, step 115).

The third computation section 13 writes the new dead time compensation amount βxm' in the memory 41, thereby renewing the dead time compensation amount βxm stored in the memory 41 with the new dead time compensation amount βxm'. That is, the third computation section 13 renews the dead time compensation amount βxm, which has been used in the correction process at step 112, with the new dead time compensation amount βxm', and stores the new dead time compensation amount βxm' in the memory 41 (βxm=βxm', step 116).

At step 110, when determining that the direction of current of the X phase is not "negative" (step 110: NO), that is, when the phase current value of the X phase is "0", the third computation section 13 does not correct the DUTY instruction value αx sent from the second computation section 12 (αx'=αx, step 117).

In the present embodiment, every time the DUTY instruction value αx is sent from the second computation section 12, the third computation section 13 executes steps 101 to 117 for each phase to execute the compensation.

Operation of the motor controller of the present embodiment configured as above will now be described.

As described above, if it is assumed that the response speeds of all the FETs 21a to 21f, which form the PWM inverter 4, are the same, it is possible to compensate for current distortion due to dead time by executing the conventional compensation method in which a predetermined dead time compensation amount β is added to or subtracted from the DUTY instruction value αx in accordance with the direction of current of each phase.

Figure 4:
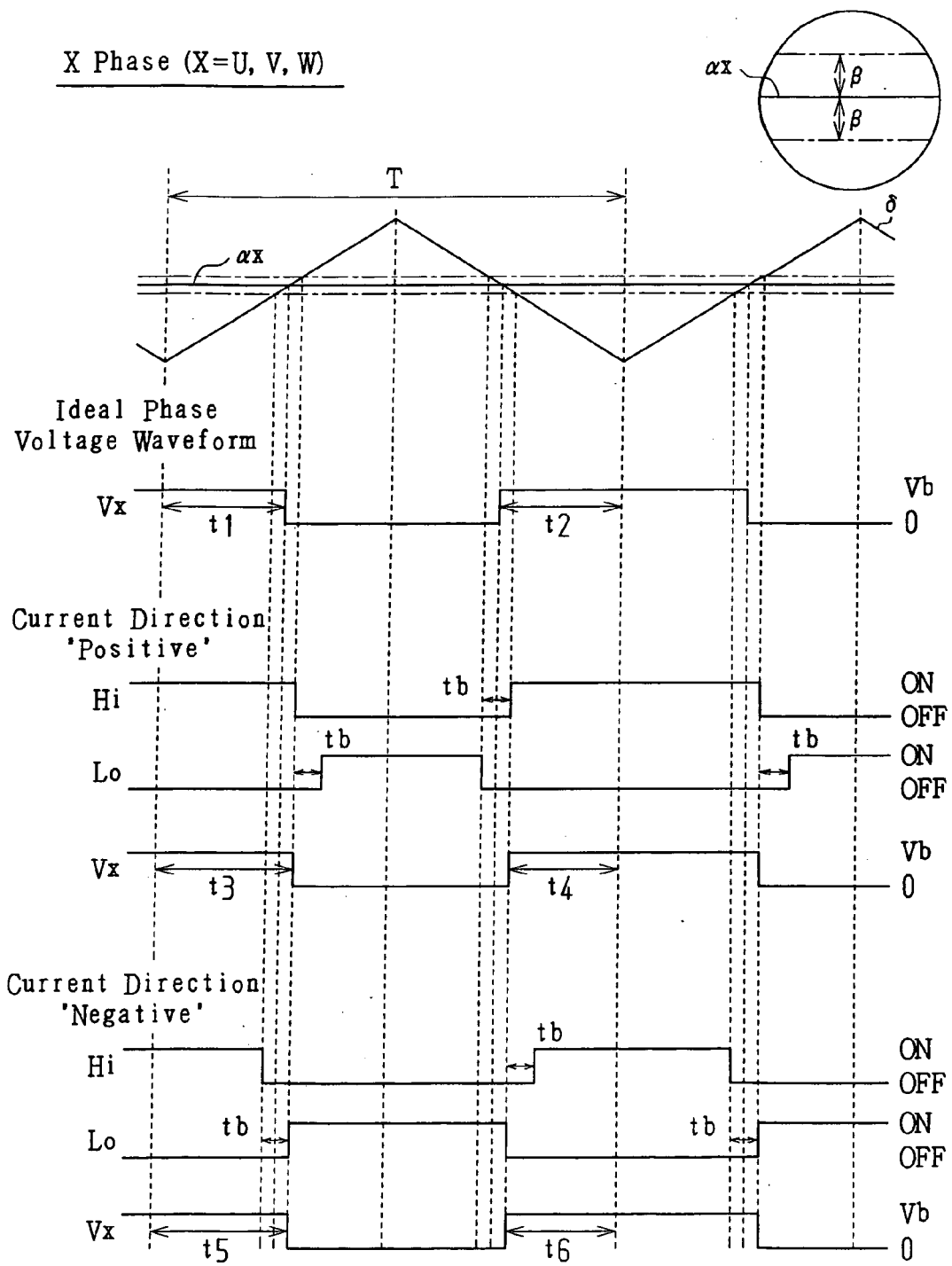
FIG. 4 is a waveform chart for explaining the operation of prior art compensation.

That is, as shown in FIG. 4, theoretically, by appropriately setting the dead time compensation amount β, the actual DUTY value γx (γx=(t3+t4)/T or (t5+t6)/T) of each phase becomes equal to the DUTY instruction value αx (αx=(t1+t2)/T) before compensation. Therefore, errors between the phase voltage command values Vu*, Vv*, Vw* and the average output voltage of each phase of the PWM inverter 4 are reduced, so that current distortion due to dead time is compensated for.

However, in reality, since the response speeds of the FETs 21a to 21f forming the PWM inverter 4 vary, the variation in the response speeds causes the equation t1+t2 t3+t4=t5+t6 not to hold according to the conventional compensation method. As a result, the compensation amounts would be insufficient or excessive.

Taking these into consideration, the motor controller 1 of the present embodiment stores the dead time compensation amounts βxp, βxm for each phase and its direction of current in the memory 41. The motor controller 1 reads out the dead time compensation amount βxp or βxm that corresponds to the direction of current, and adds it to the DUTY instruction value αx, thereby correcting the DUTY instruction value αx for each phase and its direction of current. Therefore, even if the response speeds of the FETs 21a to 21f vary due to individual difference, the compensation is executed with high accuracy.

Insufficiency and excess of the dead time compensation amount manifest themselves as the difference value $\Delta x$ between the DUTY instruction value $\alpha x$ before correction and the actual DUTY value $\gamma x$. Taking this into consideration, the ON times ton_u, ton_v, and ton_w, in which the output voltage of each phase of the PWM inverter 4 becomes power supply voltage Vb in the cycle T of the triangular wave $\delta$ are measured in the present embodiment, so that each actual DUTY value $\gamma x$ is detected. Then, each actual DUTY value $\gamma x$ is subtracted from the corresponding DUTY instruction value $\alpha x$ before correction, so that the difference value $\Delta x$ is computed. Each difference value $\Delta x$ is added to the dead time compensation amounts $\beta xp$, $\beta xm$ to compute new dead time compensation amount $\beta xp'$, $\beta xm'$. The dead time compensation amounts $\beta xp$, $\beta xm$ stored in the memory 41 are renewed with the new dead time compensation amount $\beta xp'$, $\beta xm'$.

Therefore, the subsequent dead time compensation will be executed with even higher accuracy. Also, variations of the response speed of the FETs 21*a* to 21*f* due to individual differences and variations in the temperature characteristics and aging characteristics due to the use environment are compensated for. Further, since the DUTY instruction value $\alpha x$ is basically corrected by adding the dead time compensation amounts $\beta xp$, $\beta xm$ to the DUTY instruction value $\alpha x$ stored in the memory 41, a delay due to compensation does not occur as in a case where feedback control such as PID control is executed.

The present invention provides the following advantages.

(1) The microcomputer 2 has the memory 41, which stores the dead time compensation amounts $\beta xp$, $\beta xm$ for each phase. The compensation computation section 13, or the third computation section 13, detects the direction of current of each phase. The third computation section 13 then reads out the dead time compensation amount $\beta xp$ or $\beta xm$ that corresponds to the direction of current, and adds it to the received DUTY instruction value $\alpha x$, thereby correcting the DUTY instruction value $\alpha x$.

This configuration allows the DUTY instruction value to be independently corrected for each phase and its direction of current. Thus, even if the response speeds of the FETs 21*a* to 21*f* forming the PWM inverter 4 vary among the individuals, current distortion due to dead time is compensated for accurately.

(2) The microcomputer 2 has the actual DUTY value detection section 42 that detects the actual DUTY value $\gamma x$ by measuring the ratio of time in which the output voltage of each phase becomes the power supply voltage Vb in the cycle T of the triangular wave $\delta$, which is the carrier wave in the PWM control. The third computation section 13 subtracts the actual DUTY value $\gamma x$ from the DUTY instruction value. $\alpha x$ before correction, thereby computing a difference value $\Delta x$. Then, the third computation section 13 adds the difference value $\Delta x$ to the dead time compensation amount $\beta xp$ or $\beta xm$, which has been used in the correction of the DUTY instruction value $\alpha x$, thereby determining the new dead time compensation amounts $\beta xp'$ and $\beta xm'$. The third computation section 13 renews the dead time compensation amounts $\beta xp$, $\beta xm$ stored in the memory 41 with the new dead time compensation amount $\beta xp'$, $\beta xm'$.

According to this configuration, the subsequent compensation will be executed with even higher accuracy, and variations in the temperature characteristics and aging characteristics due to the use environment are compensated for as well as variations of the response speed of the FETs 21*a* to 21*f* among the individuals. As a result, irrespective of the use environment, current distortion due to dead time is prevented with high accuracy, so that torque ripple and noise due to vibration that accompany current distortion are suppressed. Therefore, the present embodiment is suitable for, for example electric power steering systems in which vibration and noise are likely to be disturbing.

In addition, since the DUTY instruction value $\alpha x$ is corrected basically by adding the dead time compensation amounts $\beta xp$, $\beta xm$ stored in the memory 41 to the DUTY instruction value $\alpha x$, a delay due to compensation does not occur unlike in feedback control such as PID control.

Further, since the dead time compensation amounts $\beta xp$, $\beta xm$ stored in the memory 41 are successively renewed with the new dead time compensation amounts $\beta xp'$, $\beta xm'$, the dead time compensation amounts $\beta xp$, $\beta xm$ do not need to be determined at initialization (when determining factory default settings). For example, the setting such as $\beta xp$, $\beta xm=0$ does not need to be applied. This eliminates the setting process and thus reduces the manufacturing costs.

The above illustrated embodiment may be modified as follows.

In the illustrated embodiment, the third computation section 13 executes compensation every time receiving the DUTY instruction value $\alpha x$ from the second computation section 12. However, the third computation section 13 may execute compensation at predetermined cycle for the determination of a new dead time compensation amount and renewal of the dead time compensation amounts $\beta xp$, $\beta xm$ stored in the memory 41 (steps 106 to 109 or steps 113 to 116). This configuration allows a microcomputer with limited processing power to execute compensation with high accuracy.

Therefore, the present examples and embodiments are to be considered as illustrative and not restrictive and the invention is not to be limited to the details given herein, but may be modified within the scope and equivalence of the appended claims.

What is claimed is:

1. A motor controller comprising a PWM output section and a PWM inverter, the PWM output section outputting a gate ON/OFF signal by comparing a DUTY instruction value and a carrier wave, the PWM inverter being formed of a plurality of switching element circuits in parallel, each switching element circuit being formed of a pair of switching elements in series, wherein the PWM inverter converts direct-current power supply into three-phase driving power by turning on and off each switching element based on the gate ON/OFF signal, and supplies the three-phase driving power to a motor, wherein dead time is set in the gate ON/OFF signal for preventing arm short circuits in each switching element;

a current direction detection section for detecting a direction of current for each phase;

a memory section storing, for each phase, a first compensation amount that corresponds to a case where the direction of current is a positive direction, and a second compensation amount that corresponds to a case where the direction of current is a negative direction;

a dead time compensation section for correcting the DUTY instruction value for each phase and the direction of current of the phase by adding the first compensation amount or the second compensation amount to the DUTY instruction value according to the detected direction of current; and an actual DUTY value detection section that measures time in which the output voltage of each phase of the PWM inverter becomes the power supply voltage in one cycle of the carrier wave, thereby detecting an actual DUTY value that corresponds to the DUTY instruction value, wherein the dead time compensation section adds a difference value between the DUTY instruction value before the correction and the actual DUTY value to the compensation amount used in the correction, thereby determining a new compensation amount, and the dead time compensation section renews the compensation amount used in the correction with the new compensation amount and stores the new compensation amount in the memory section.

2. The motor controller according to claim 1, wherein the dead time compensation section determines the new compensation amount and stores the new compensation amount in the memory section at a predetermined cycle.

3. The motor controller according to claim 1, wherein each switching element comprises a power MOSFET.

4. The motor controller according to claim 1, wherein the carrier wave is a triangular wave.

5. The motor controller according to claim 4, wherein the actual DUTY value detection section includes a timer measurement module and an actual DUTY value computation section, wherein the timer measurement module receives an output voltage waveform of each phase, with waveforms being formed to be measurable, wherein the timer measurement module measures time from rising to falling of the waveform, thereby measuring an ON time, during which the output voltage of each phase of the PWM inverter becomes the power supply voltage, and wherein the actual DUTY value computation section divides the ON time sent from the timer measurement module by the cycle of the triangular wave, thereby computing the actual DUTY value of the output voltage of each phase.

6. The motor controller according to claim 1, wherein the motor is a brushless motor.

7. A dead time compensation method for a motor controller having a PWM output section and a PWM inverter, the PWM output section outputting a gate ON/OFF signal by comparing a DUTY instruction value and a carrier wave, the PWM inverter being formed of a plurality of switching element circuits in parallel, each switching element circuit being formed of a pair of switching elements in series, wherein the PWM inverter converts direct-current power supply into three-phase driving power by turning on and off each switching element based on the gate ON/OFF signal, and supplies the three-phase driving power to a motor, wherein dead time is set in the gate ON/OFF signal for preventing arm short circuits in each switching element, the method comprising:

detecting a direction of current of each phase;

correcting the DUTY instruction value for each phase and the direction of current of the phase by adding one of a first compensation amount that corresponds to a case where the direction of current is a positive direction, and a second compensation amount that corresponds to a case where the direction of current is a negative direction to the DUTY instruction value according to the detected direction of current;

detecting an actual DUTY value that corresponds to the DUTY instruction value by measuring time in which the output voltage of each phase of the PWM inverter becomes the power supply voltage in one cycle of the carrier wave;

determining a new compensation amount by adding a difference value between the DUTY instruction value before the correction and the actual DUTY value to the compensation amount used in the correction; and renewing the compensation amount used in the correction with the new compensation amount and storing the new compensation amount in the memory section.

8. The dead time compensation method according to claim 7, wherein the determination of the new compensation amount and the storing of the new compensation amount are executed at a predetermined cycle.

* * * * *